United States Patent [19]
Beck

[11] 3,958,869
[45] May 25, 1976

[54] SOUND MOTION PICTURE CAMERA
[75] Inventor: James E. Beck, Glenview, Ill.
[73] Assignee: Bell & Howell Company, Chicago, Ill.
[22] Filed: July 2, 1975
[21] Appl. No.: 592,445

[52] U.S. Cl. .................................. 352/35; 352/1; 352/5
[51] Int. Cl.² ......................................... G03B 31/00
[58] Field of Search .............................. 352/1, 5, 35

[56] References Cited
UNITED STATES PATENTS
2,074,030  3/1937  Shoup ..................................... 352/1

Primary Examiner—Monroe H. Hayes
Attorney, Agent, or Firm—Richard O. Gray, Jr.; John E. Peele, Jr.

[57] ABSTRACT

The disclosure relates to a system for providing a substantially noise free audio intelligence signal for a sound-movie camera. The system comprises first and second microphones mounted on the camera, the first microphone being arranged for detecting camera noise and audio intelligence for providing a first electrical signal having camera noise and audio intelligence components and the second microphone being arranged for detecting substantially only camera noise for providing a second electrical signal having substantially only a noise component. The second microphone is mounted nearer to the camera noise source than the first microphone so that the second signal is in advanced phase relation relative to the first signal. The system also includes a delay means and inverting means for delaying and inverting the second signal to provide a delayed inverted second signal which is in phase with the first signal. A combining means combines the delayed inverted second signal and the first signal to thereby cancel the noise components and provide a third signal having substantially only an audio intelligence component to be recorded.

7 Claims, 2 Drawing Figures

SOUND MOTION PICTURE CAMERA

BACKGROUND OF THE INVENTION

The present invention is generally directed to a sound-movie camera and more particularly to a system for providing a substantially noise free audio intelligence signal for a sound-movie camera.

Home sound movies have become very popular in recent years. Cameras for recording home sound movies generally include a sound system associated with but separate from the motion picture camera. The sound systems record the audio intelligence as the camera records the action on film and then the recorded sound track is applied to the movie film adjacent the film frames. The sound systems for such use have had to be separate and apart from the camera to avoid picking up the noise generated by the motion picture camera. Hand held microphones have served this purpose. Unfortunately, such arrangements are cumbersome in use. The microphone must be either held by a person other than the camera operator or placed at a fixed location which consequently greatly reduces the freedom of movement of the subjects.

It would therefore be desireable to be able to have the sound system microphone mounted directly on the camera itself. This would provide freedom of movement for the subjects and would not require an additional person for holding the microphone.

Prior attempts to mount sound system microphones onto motion picture cameras have failed. The main reason for these failures resides in the fact that the intensity of the noise generated by the motion picture cameras and the detected audio intelligence are roughly equivalent. While schemes have been tried to eliminate the camera noise, they have either been very costly or have not been effective.

It is therfore a general object of the present invention to provide a new and improved sound system for a sound-movie camera.

It is a particular object of the present invention to provide a system for producing a substantially noise free audio intelligence signal for a sound-movie camera wherein the sound microphone is mounted on the camera.

SUMMARY OF THE INVENTION

The invention provides a system for producing a substantially noise free audio intelligence signal for a sound-movie motion picture camera. The system comprises a first detector on the camera for detecting audio intelligence and camera noise and for converting the detected audio intelligence and camera noise into a first electrical signal having audio intelligence and noise components; a second detector on the camera for detecting only camera noise and for converting the detected camera noise into a second electrical signal having substantially only a noise component; and means for delaying one or the other of the electrical signals to thereby render the first and second signals substantially in phase. The system also comprises means for inverting one of the electrical signals to thereby produce an inverted electrical signal and means for combining the inverted electrical signal and the non-inverted signal. With the signals in phase and the one signal inverted, the combining means substantially eliminates the noise component of the signals to therby produce a third signal comprising substantially only an audio intelligence component.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawing and in the several figures of which like reference numerals indicate identical elements and in which:

DESCRIPTION OF THE PREFERRED EMBODIMENT

Figure 1:
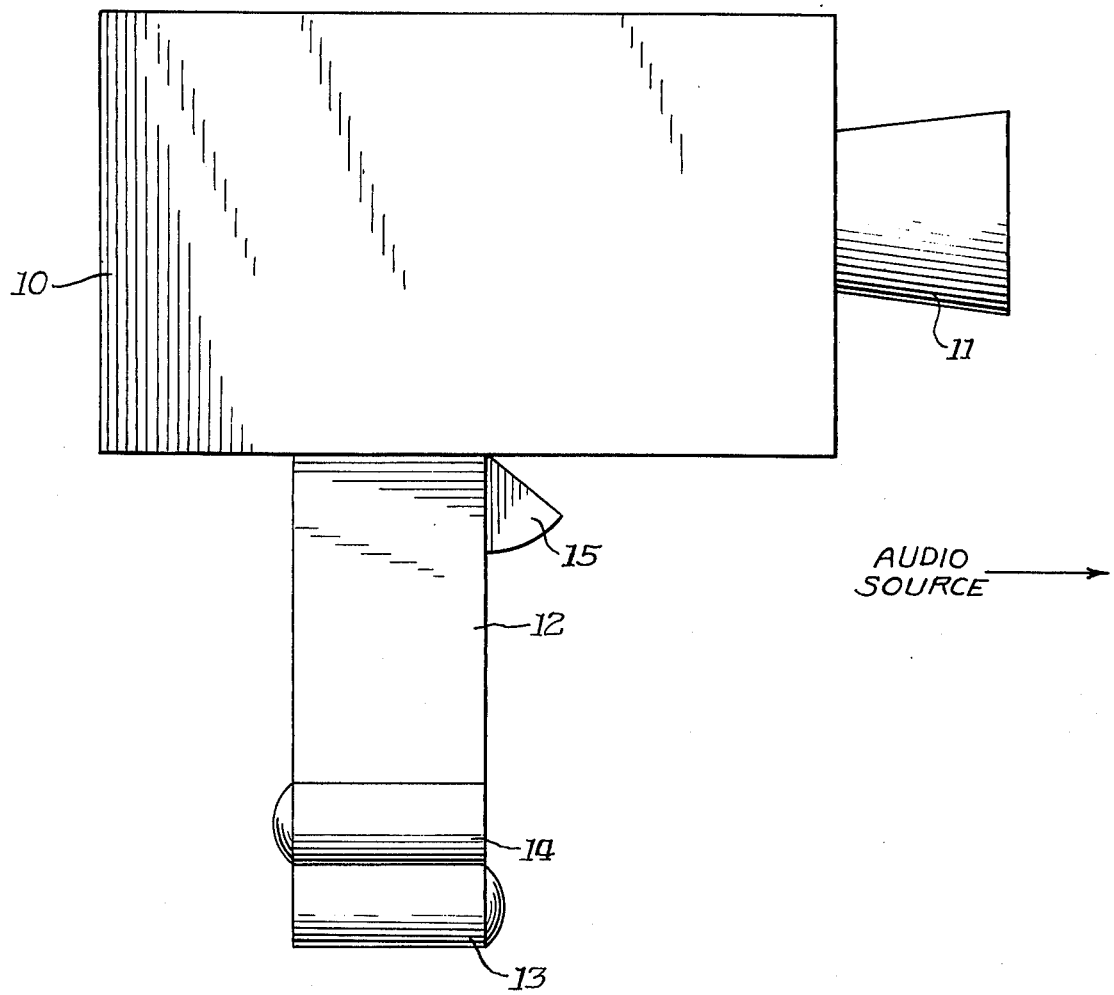
FIG. 1 is a schematic representation of a motion picture camera which includes a system embodying the present invention.

Referring now to FIG. 1, there is shown a motion picture camera or other device in which noise is generated from a single source and is not of a purely random nature. The camera includes a main body 10, and objective lens 11, a grip handle 12, a first microphone 13 and a second microphone 14.

Main body 10 includes the usual mechanical elements for taking motion pictures. The motor, shutter, film transport etc. are activated for taking motion pictures when trigger 15 is depressed. The grip handle 12 extends from main body 10 and facilitates holding of the camera and control of trigger 15.

First microphone 13 is mounted at the extreme end of handle 12 and is directed forward of the camera towards the audio source. It detects camera noise including vibration and audio intelligence and converts the detected camera noise and audio intelligence into a first electrical signal having audio intelligence and noise components.

Second microphone 14 is mounted next to the first microphone at the end of handle 12. The second microphone 14 is directed in a rearward direction of the camera away from the audio source for detecting substantially only camera noise. It converts the detected camera noise into a second electrical signal having substantially only a noise component.

Figure 2:
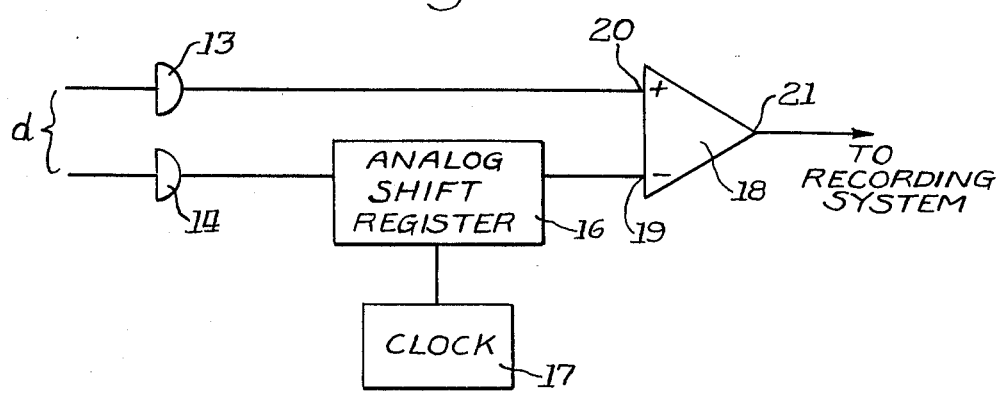
FIG. 2 is a schematic circuit diagram, partially in block form, of a system embodying the present invention.

Although the first and second microphones are mounted next to each other, they are still spaced apart by a finite distance d as represented in FIG. 2. The second microphone 14 is mounted on handle 12 nearer to the camera body than the first microphone 13. As a result, microphone 14 will receive its sound noise signal before microphone 13 receives the noise component of its sound signal. As a result, the second signal produced by microphone 14 will be in advanced phase relation relative to the first signal. Also, both microphones are mounted at the end portion of handle 12 so that each will receive noise signals having as nearly as identical waveforms as possible.

Referring now to FIG. 2, the circuit there shown processes the first and second signals in such a manner as to produce at output 21 a third signal having substantially only an audio intelligence component for being recorded by the sound-movie camera recording system. The circuit comprises, in addition to first microphone 13 and second microphone 14, a delay means in the form of an analog shift register 16, a clock 17, and a combining means in the form of a difference amplifier 18. The difference amplifier 18 has an inverting input 19 comprising an inverting means, a noninverting input 20, and an output 21 which provides the third signal having substantially only an audio component to be recorded.

In providing the third signal, the circuit of FIG. 2 delays the second signal for a sufficient time to compensate for the displacement distance between microphones 13 and 14 so that a delayed second signal is produced which is in phase with the first signal. The delayed second signal is then inverted to provide a delayed inverted second signal which is then combined with the first signal. Because the noise components are now in phase, and one signal noise component is inverted relative to the other, as they are combined, the noise components cancel each other leaving substantially only the audio intelligence component remaining in the form of a third signal at output 21.

In achieving the above summarized operation, analog shift register 16 is coupled to microphone 14 for delaying the second signal. It is also coupled to inverting input 19 of amplifier 18 to thereby cause the delayed second signal to be inverted. Microphone 13 is coupled to non-inverting input 20. Analog shift register 16 is also coupled to clock 17 to receive clockpulses of a proper predetermined frequency to provide the necessary amount of delay required to bring the second signal into phase with the first signal.

Analog shift registers are commonly referred to as "bucket brigades" and are well known in the art. They are described for example in Electronics Magazine, Feb. 28, 1972, at pages 62 through 67. One bucket brigade which is suitable for practicing the present invention is type TCA 350 manufactured by ITT Semiconductors of Palm Beach, Florida.

Briefly, bucket brigades operate in a manner similar to the operation of digital shift registers. They comprise a plurality of stages which temporarily store an analog signal and pass the stored signal on to the next stage as the bucket brigade is clocked.

For determining the clock frequency required for clock 17 to cause analog shift register 16 to delay the second signal by a proper delay time to bring it in phase with the first signal, the following formula may be used:

$$t = d/s = N/2f$$

where:
$t$ is the required delay time;
$d$ is the distance between microphones in feet;
$s$ is the speed of sound (approximately 1100 feet per second); and
$f$ is the desired clock frequency in $H_z$
N is the number of stages or buckets in the bucket brigade
(For the TCA 350, N=185, and its maximum operating frequency is 500 $KH_z$.)

By simple algebra, the above formula may be transformed to:

$$f = Ns/2d$$

As an example, assuming that the distance between microphones is 2.5 inches or approximately 0.2 feet, the required clock frequency would be:

$$f = \frac{(185)(1100)}{2(.2)} = 508,750\ H_z$$

In operation, when a sound motion picture is to be taken, the first microphone 13 detects the desired audio intelligence and the camera noise and converts the detected audio intelligence and camera noise into a first electrical signal having both audio intelligence and noise components. Microphone 14, because it is directed towards the rear of the camera away from the audio intelligence source, detects substantially only camera noise and converts it to a second signal having substantially only a camera noise component. Because microphone 14 is nearer to the main body 10 of the camera than microphone 13, the noise component of the second signal will be in advanced phase relation relative to the noise component of the first signal.

Analog shift register 16, upon being clocked by clock 17 at a frequency determined as herein described, delays the second signal by an amount to cause the noise components of the first and second signals to be in phase. Difference amplifier 18 inverts the delayed second signal and combines it with the first signal. Because the noise components of both signals are in phase with one being the inversion of the other, the difference amplifier 18 will provide at output 21 a third signal having substantially only an audio intelligence component. This obtains because in the process of combining the first signal and the delayed inverted second signal, the noise components cancel each other. The resultant substantially noise free audio intelligence signal at output 21 may then be transferred to the recording system of the camera for being recorded.

The present invention thus provides a system for producing a substantially noise free audio intelligence signal for use in a sound-movie camera system. The present invention allows the microphone pickups to be on the camera itself providing increased ease of operation and freedom of movement for the subjects of the movies.

While a particular embodiment of the invention has been shown and described, modifications may be made, and it is intended in the appended claims to cover all such modifications as may fall within the true spirit and scope of the invention.

I claim:
1. In a sound-movie motion picture camera of the type having a body which comprises a source of camera noise, a means for producing a substantially noise free audio intelligence signal comprising:
   a first detector on the camera for detecting audio intelligence and camera noise and for producing a first electrical signal having audio intelligence and camera noise components;
   a second detector on the camera for detecting substantially only camera noise and for producing a second electrical signal having substantially only a noise component;
   one of said detectors being closer to the camera noise source than the other said detector whereby said signal produced by said one detector is in advanced phase relation to said signal produced by said other detector;
   means for delaying said signal produced by said one detector to thereby provide first and second signals which are in phase;

means for inverting one of said in phase signals to thereby provide an inverted signal; and means for combining said inverted signal with the non-inverted in phase signal to thereby cancel said noise components and to produce a third signal which includes substantially only an audio intelligence component.

2. In a sound-movie motion picture camera of the type which includes a main body which comprises a source of camera noise and a grip handle extending from the main body to facilitate holding of the camera by an operator, a system for producing a substantially noise free audio intelligence signal comprising:

a first microphone on the camera for detecting audio intelligence and camera noise and for converting the detected audio intelligence and camera noise into a first electrical signal having audio intelligence and camera noise components;

a second microphone on the camera, spaced apart from said first microphone and directionally arranged for detecting substantially only camera noise and for converging the detected camera noise into a second electrical signal having substantially only a noise component;

said second microphone also being located nearer to the camera body than said first microphone whereby said noise component of said second signal is in advanced phase relation relative to said first signal;

delay means coupled to said second microphone for delaying said second signal and for providing a delayed second signal which is in phase with said first signal;

inverting means coupled to said delay means for inverting said delayed second signal to thereby provide a delayed inverted second signal; and combining means for combining said first signal with said delayed inverted second signal; whereby, with said second signal having substantially only said noise component being in phase with said first signal and inverted, as said first signal and said delayed inverted second signals are combined, said noise components are cancelled providing a third signal having substantially only an audio intelligence component.

3. A system in accordance with claim 2 wherein said delay means comprises an analog shift register and a clock pulse source for clocking said analog shift register.

4. A system in accordance with claim 3 wherein said combining means comprises a difference amplifier having an inverting input and wherein said inverting means comprises said inverting input.

5. A system in accordance with claim 4 wherein said microphones are mounted onto the grip handle of the camera.

6. A system in accordance with claim 5 wherein said microphones are mounted at the end portion of the grip handle to thereby detect essentially the same camera noise.

7. A system in accordance with claim 6 wherein said first microphone is directed in a forward direction of the camera to thereby detect both audio intelligence and camera noise and wherein said second microphone is directed in a rearward direction of the camera to thereby detect substantially only camera noise.

* * * * *